United States Patent
Preis et al.

(10) Patent No.: US 6,356,040 B1
(45) Date of Patent: Mar. 12, 2002

(54) ARRANGEMENT FOR DETERMINING THE STATE OF A HIGH-PRESSURE GAS DISCHARGE LAMP ON SWITCHING-ON

(75) Inventors: Karl-Heinrich Preis, Bühlertal; Stefan Koch, Ottersweier; Klaus Eckert, Durbach Ebersweier; Ernst Damerau, Pfullingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,605

(22) PCT Filed: Aug. 27, 1997

(86) PCT No.: PCT/DE97/01936

§ 371 Date: Nov. 15, 1999

§ 102(e) Date: Nov. 15, 1999

(87) PCT Pub. No.: WO98/14035

PCT Pub. Date: Apr. 2, 1998

(30) Foreign Application Priority Data

Sep. 26, 1996 (DE) ...................................... 296 16 655 U

(51) Int. Cl.[7] .............................................. H05B 37/02
(52) U.S. Cl. .......................................... 315/309; 315/82

(58) Field of Search .......................... 315/82, 307, 224, 315/209 R, 309

(56) References Cited

U.S. PATENT DOCUMENTS

| | | | |
|---|---|---|---|
| 4,162,429 A | * 7/1979 | Elms et al. | 315/284 |
| 4,240,009 A | 12/1980 | Paul | |
| 5,151,634 A | * 9/1992 | Nepote et al. | 315/307 |
| 5,962,990 A | * 10/1999 | Kern | 315/307 |
| 6,051,939 A | * 4/2000 | Eckert | 315/307 |

FOREIGN PATENT DOCUMENTS

| | | |
|---|---|---|
| DE | 195 35 663 | 3/1997 |
| DE | 195 36 644 | 4/1997 |
| JP | 01 292796 | 11/1989 |

* cited by examiner

Primary Examiner—David Vu
(74) Attorney, Agent, or Firm—Kenyon & Kenyon

(57) ABSTRACT

An arrangement for detecting the condition of a high pressure gas discharge lamp when switched on is described, where a control unit either injects a defined current into the lamp and measures the resulting voltage drop, or it applies a defined voltage to the lamp and measures the lamp current flowing in so doing and, depending on the result, it starts the lamp according to the condition of the lamp thus determined.

15 Claims, 1 Drawing Sheet

ARRANGEMENT FOR DETERMINING THE STATE OF A HIGH-PRESSURE GAS DISCHARGE LAMP ON SWITCHING-ON

FIELD OF THE INVENTION

The present invention relates to an arrangement for detecting the condition of a high pressure gas discharge lamp upon switching on, in particular, the lamp temperature.

BACKGROUND INFORMATION

U.S. Pat. No. 4,240,009 describes a circuit for operating a gas discharge lamp which determines, adjusts and controls the power supplied to the lamp on the basis of a characteristic curve. The control unit has a power supply circuit which is controlled and regulated by a voltage-current characteristic, so that the lamp is kept in operation at a certain power, in particular, at a constant power. With the circuit, the power is determined by a wattmeter which measures the power supplied by a battery to a regulated inverter circuit on the basis of the applied voltage and the resulting current and generates control signals for the inverter circuit on the basis of the predetermined voltage-current characteristic. When a constant power is maintained for the lamp, the respective operating point is on the power hyperbola.

The Vedilis curve is given in general as the current-voltage curve in the sense of a setpoint curve for controlling a high pressure gas discharge lamp in startup and during operation. The Vedilis curve is described on page B 1/3 of "System Specifications for Field Test" of the *VEDILIS Eureka Project* 273, where it is given as the current-voltage characteristic for gas discharge lamps used in motor vehicles. "Vedilis" is an abbreviation for "vehicle discharge light system." According to this document, to regulate the lamp power of a gas discharge lamp, lamp voltage U, for example, is measured in the startup phase or in the operating phase, and corresponding lamp current I correlating with respective lamp voltage U is determined from the Vedilis curve. This lamp current I then serves as the setpoint for the current control circuit with which the lamp power is regulated at a constant level, e.g., 35 W.

In general, in order to use a gas discharge lamp in an automotive headlamp, the desired quantity of light must be supplied within the shortest possible amount of time after switching on the control unit. This is referred to as a rapid lamp start. As indicated by the Vedilis curve, the gas discharge lamp can be operated with a certain overload immediately after being switched on for this purpose. Then after reaching a certain voltage, this overload is reduced in accordance with the lamp voltage. This reduction follows the characteristic curve. It is clear that such an overload must not destroy the lamp or shorten its lifetime. This requirement must be met for all operating conditions.

After lighting the high pressure gas discharge lamp, it is thus operated with a defined overload in rapid lamp start, so that it delivers the required quantity of light as rapidly as possible. It is important in starting the lamp in general and in restarting it to know its condition, in particular the temperature of the lamp. Lamp start is better when the correct overload is applied, depending on the prevailing lamp temperature. The amount and duration of the overload depend on the condition of the lamp. For example, if the lamp has been turned off for a long time and is therefore cold, then it must be operated with a greater overload over a longer period of time than if it has been off only briefly and thus is still hot when restarted.

To ascertain the condition of a high pressure gas discharge lamp, the temperature can be deduced indirectly by charging and discharging a special capacitor. The capacitor is charged when the lamp is turned on, and the capacitor is discharged when the lamp is turned off. The on and off times can be determined on the basis of the voltage on the capacitor, and thus the condition of the lamp can be deduced. A disadvantage here is the additional expense in terms of hardware for the capacitor and other required components. The time constant is large and is in the range of seconds, e.g., approximately 10 S.

Alternatively, the control unit may also be left running even while the lamp is turned off, to determine the lamp temperature by determining the on and off times. This possibility requires the control unit to be supplied with power continuously and therefore it may have to be provided with a special terminal. Here again, the disadvantage is that additional suitable components and power must also be provided.

SUMMARY OF THE INVENTION

An arrangement according to the present invention has the advantage over the related art of lower component costs while achieving good results in determining the lamp condition upon turning on. The condition of the high pressure gas discharge lamp can be determined although it is not known directly how long the lamp had been turned on and subsequently turned off. Thus, the control unit need not remain running while the lamp is turned off to determine the off time.

In principle, it is provided according to the present invention that, to detect the lamp condition upon turning on, the control unit shall inject a defined current into the lamp, measure the resulting voltage drop, the lamp voltage, and analyze it, or as an alternative, the control unit may apply a defined voltage to the lamp and measure and analyze the lamp current flowing in so doing, and with both alternatives, the control unit then starts the lamp in accordance with the condition of the lamp so detected.

According to one embodiment of the present invention that is especially advantageous and expedient for both alternatives, the control unit injects the current and performs the respective voltage measurement or applies the voltage and measures the respective current and performs the respective analysis shortly after the lamp is turned on, in particular, immediately after starting the lamp. It is especially expedient that according to another embodiment of the present invention, the control unit performs the measurement operations in the load circuit of the lamp, because it thus does not cause distortion of results and does not require any additional components. In an advantageous manner, the control unit stores the measurement results for the respective lamp start.

According to an advantageous refinement of the present invention, the control unit performs the measurement and analysis operations multiple times, in particular, in rapid succession, and forms a consolidated value from the results. According to an expedient embodiment of this refinement, the control unit forms the average as the consolidated value. In an advantageous refinement, the consolidated value or the average is stored by the control unit. An especially advantageous embodiment of this refinement provides for the control unit to perform the measurement and analysis operations so that the lamp condition can be detected continuously.

In another expedient embodiment of the present invention, it is also possible for the control unit to analyze the variation of the measured quantity, in particular its slope, to ascertain the instantaneous lamp condition.

An especially expedient, advantageous and flexible embodiment of the present invention provides for a microcontroller with a memory to be provided in the control unit, so that the measurement operations can be controlled and the measurement results can be stored with its help.

The arrangement according to the present invention can be used in an especially advantageous and expedient manner with high pressure gas discharge lamps used in motor vehicles.

DETAILED DESCRIPTION

Figure 1:
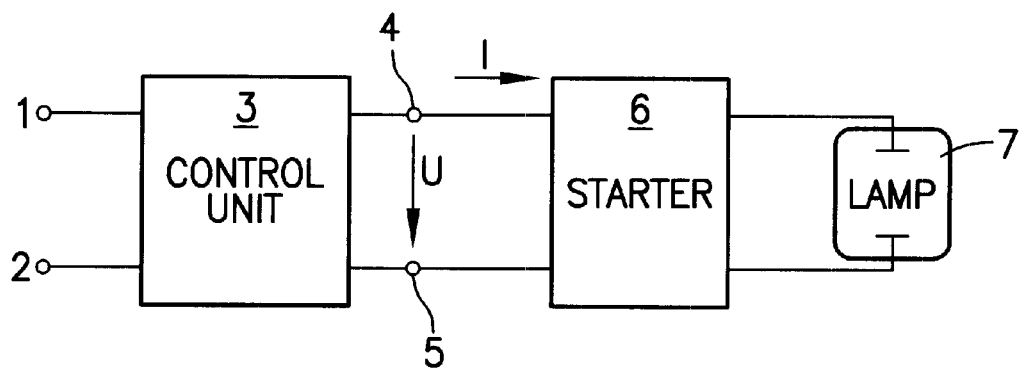
FIG. 1 illustrates a schematic block diagram of an arrangement according to the present invention.

The arrangement illustrated in FIG. 1 contains a control unit which is supplied at its input terminals 1 and 2 with the required input power from the on-board vehicle wiring system or the battery of a motor vehicle. The control unit supplies at output terminals 4 and 5 currents I and voltages U required for starting a high pressure gas discharge lamp by a starter 6. These values differ according to the operating condition of the lamp. However, it should be pointed out that these values are still the same up to and before start.

Figure 2:
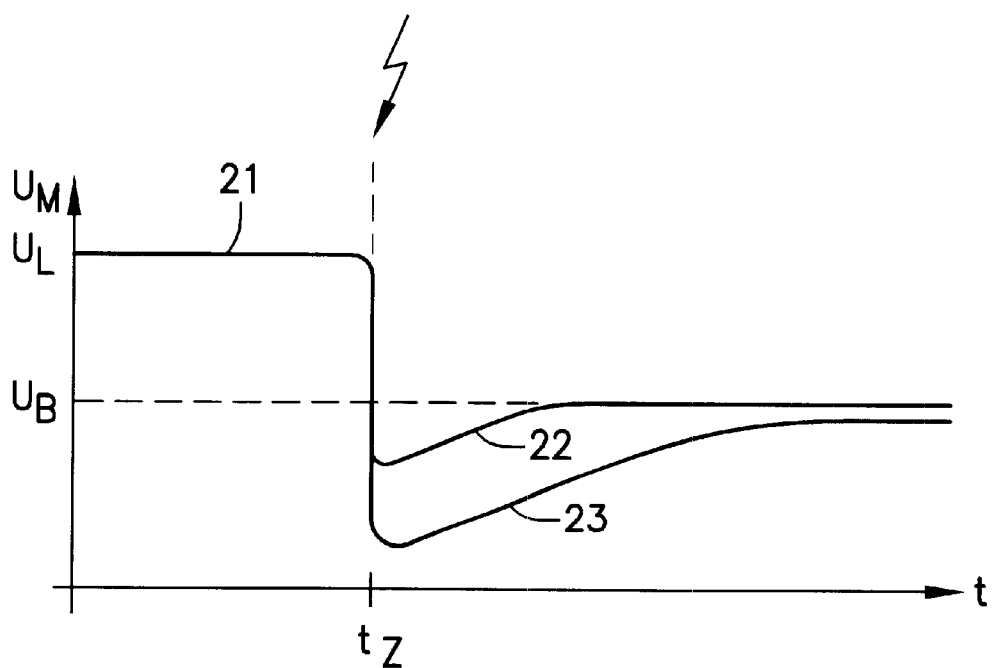
FIG. 2 illustrates a schematic diagram of a curve of a voltage measured on a lamp plotted over a time t with a hot and a cold high pressure gas discharge lamp.

FIG. 2 shows schematically the curve for voltage $U_m$ measured on lamp 7 as a function of time t with a hot and cold high pressure gas discharge lamp 7. The arrangement designed according to the present invention operates by control unit 3 injecting a defined current I into lamp 7 and measuring and analyzing the resulting voltage drop U, e.g., at terminals 4 and 5, or as an alternative, by control unit 3 applying a defined voltage to lamp 7 and measuring and analyzing the lamp current then flowing from terminal 4. Control unit 3 then controls the lamp start in accordance with the lamp condition detected. This measurement operation is preferably performed shortly after turning on and starting lamp 7 at a certain location. It is also advantageous for the voltage and current measurements to be performed in the load circuit of lamp 7, so there is no distortion of results.

Control unit 3 stores the measurement results determined by it for the respective lamp start. In an especially advantageous refinement, control unit 3 can repeat several measurement operations, e.g., four, in immediate succession and form a consolidated value, in particular, an average, from them. This more or less accurate average is then stored and made available for further analysis.

According to another embodiment of the control unit, it is also possible to perform the measurement and analysis operations several times, in particular, in rapid succession, and optionally form a storable average from the results. As an alternative, it is also possible to perform the measurement and analysis operations so that the lamp condition can be detected continuously. In another embodiment, which depends on the specific manner of use of the arrangement according to the present invention, it is possible as an alternative or in addition for control unit 3 to analyze the curve of the measured quantity, in particular, its slope, to determine the instantaneous lamp condition. According to a very flexible and advantageous embodiment of the arrangement according to the present invention, control unit 3 is provided with a microcontroller having a memory with the help of which the measurement operations can be controlled and the measurement results stored.

The mode of operation of the device according to the present invention can be such that lamp 7 is started by control unit 3 and starter 6. The lamp starts at time $t_Z$ as indicated in FIG. 2. Voltage $U_M$ drops from no-load voltage $U_L$ 21 to a lower level below operating voltage $U_B$ of lamp 7. If the lamp has not been turned off for long and therefore is still warm or hot, then the drop in voltage is not as great as that represented by curve segment 22. In this case, operating voltage $U_B$ is also reached again in a relatively short period of time. If the lamp has become cold by the time it is turned on again, the drop in voltage will be much greater, as represented by curve segment 23. In this case, operating voltage $U_B$ is reached only after a relatively long time.

Instead of injecting a current, it is also possible as an alternative it to apply a predetermined voltage and then measure the current which is established in lamp 7 and which also depends on the lamp temperature. Then the lamp temperature and the condition of the lamp can also be determined from this value.

After the lamp has been started, a constant current of a defined intensity is supplied. The voltage of the lamp is determined by measurement by control unit 3. The lamp temperature is determined from the measured or calculated voltage. A low measured voltage $U_M$ indicates a cold lamp with a relatively low temperature which corresponds to curve segment 23, and a high measurement voltage $U_M$ indicates a hot lamp with a high temperature. Operating voltage $U_B$ may differ slightly for each lamp 7, and therefore, it is especially expedient if this value is stored as a learning value which is used and taken into account in determining the lamp temperature.

The values thus determined for the temperature of lamp 7 are used in regulating the power of lamp 7 and they serve to optimally regulate rapid lamp start without applying excessive load on the lamp or other parts of the system. Therefore, in an advantageous manner, no additional components are necessary when using, for the arrangement according to the present invention, a microcontroller which is also provided for other reasons.

What is claimed is:

1. An arrangement for detecting a condition of a high pressure gas discharge lamp upon switching on, comprising:
   a control unit for supplying power to and controlling the lamp, at least one of (A) the control unit injecting a defined current into the lamp, and measuring and analyzing a resulting voltage drop, and (B) the control unit applying a defined voltage to the lamp, and measuring and analyzing a current flow from the lamp;
   wherein the control unit starts the lamp in accordance with a determined condition of the lamp.

2. The arrangement according to claim 1, wherein the condition detected is a temperature of the lamp.

3. The arrangement according to claim 1, wherein the at least one of (A) and (B) occurs shortly after turning on the lamp.

4. The arrangement according to claim 1, wherein the at least one of (A) and (B) occurs immediately after starting the lamp.

5. The arrangement according to claim 1, wherein the control unit stores at least one of the measured resulting voltage drop and the measured current flow from the lamp.

6. The arrangement according to claim 1, wherein the control unit performs at least one of the measurement of the resulting voltage drop and the measurement of the current flow from the lamp in a load circuit of the lamp.

7. The arrangement according to claim 1, wherein the control unit forms a consolidated value by performing several times at least one of the measurement and the analysis of the resulting voltage drop and the measurement and the analysis of the current flow from the lamp.

8. The arrangement according to claim 7 wherein the control unit forms the consolidated value by performing several times in rapid succession.

9. The arrangement according to claim 7, wherein the consolidated value is an average of particular values, each particular value formed by performing at least one of the measurement and the analysis of the resulting voltage drop and the measurement and the analysis of the current flow from the lamp.

10. The arrangement according to claim 7, wherein the control unit stores the consolidated value.

11. The arrangement according to claim 7, wherein the control unit continuously detects the condition of the lamp.

12. The arrangement according to claim 7, wherein the control unit analyzes a curve of at least one of the measured resulting voltage drop and the measured current flow to determine an instantaneous lamp condition.

13. The arrangement according to claim 12, wherein the control unit analyzes a slope of the curve to determine the instantaneous lamp condition.

14. The arrangement according to claim 1, wherein the control unit includes a microcontroller with a memory, the microcontroller controlling and storing at least one of the measurement of the resulting voltage drop and the measurement of the current flow from the lamp.

15. The arrangement according to claim 1, wherein the arrangement is for use with high pressure gas discharge lamps in a motor vehicle.

* * * * *